Aug. 1, 1944.　　　　W. C. GRIMM ET AL　　　　2,354,681
BUN MAKING MACHINE
Filed Jan. 6, 1943　　　　3 Sheets-Sheet 1

INVENTORS
William C. Grimm
BY Richard H. Linneman

Watson, Bristol, Johnson & Leavenworth
ATTORNEYS

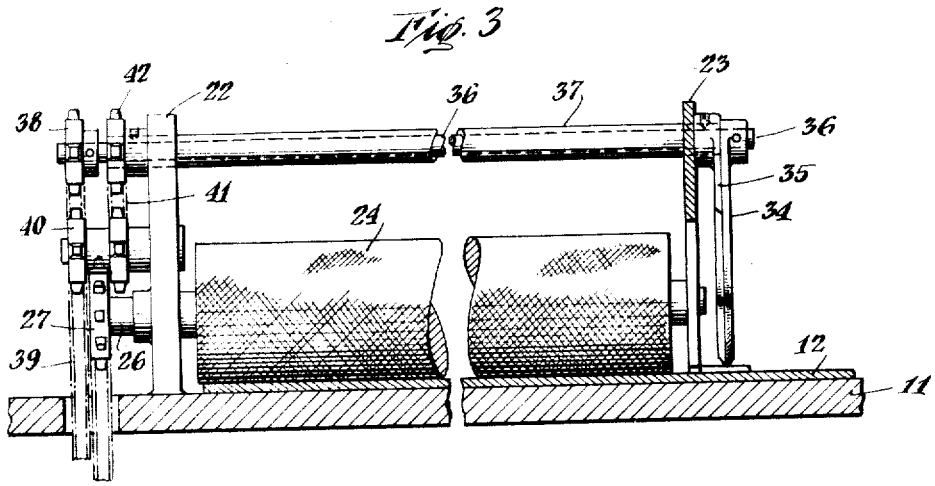
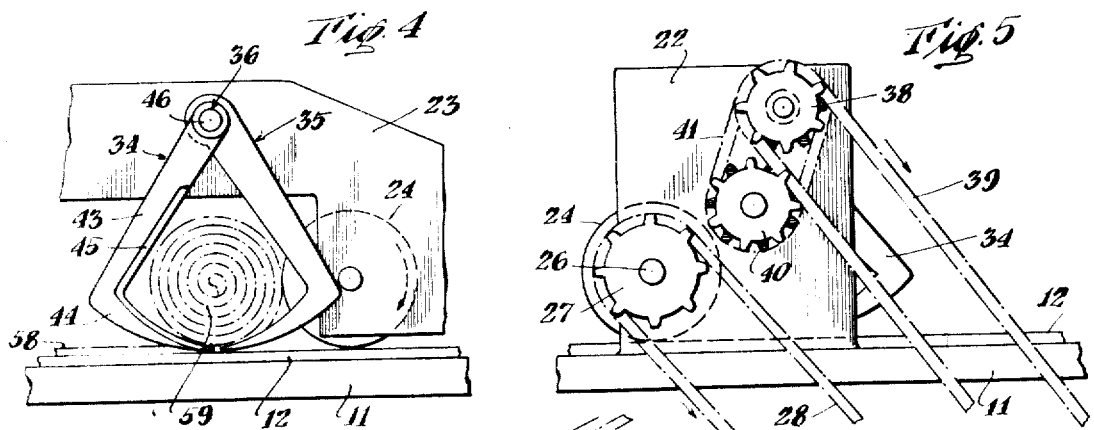
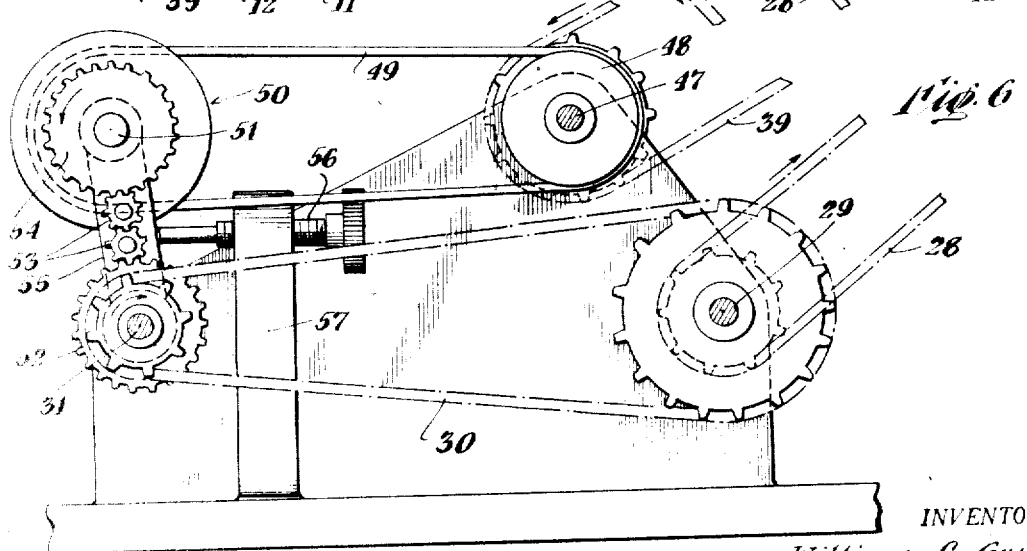

Aug. 1, 1944.   W. C. GRIMM ET AL   2,354,681
BUN MAKING MACHINE
Filed Jan. 6, 1943   3 Sheets-Sheet 3
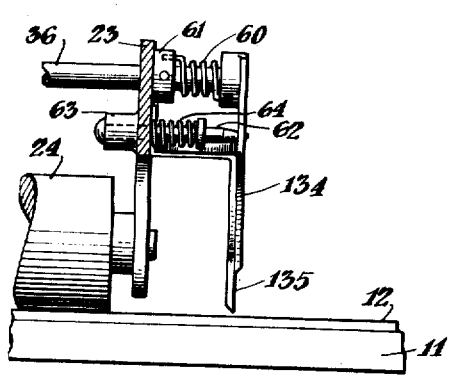
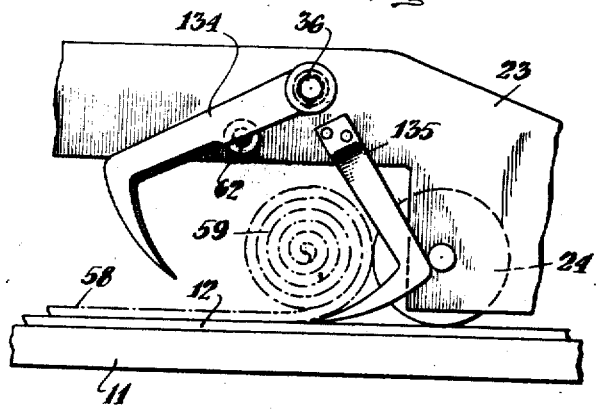
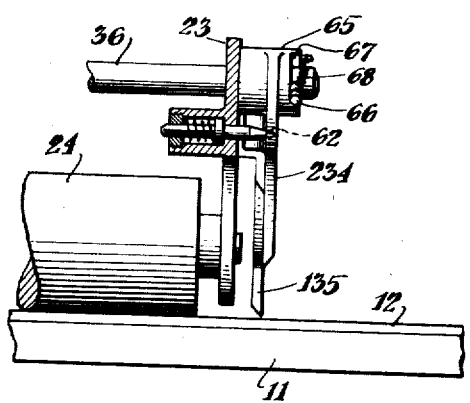
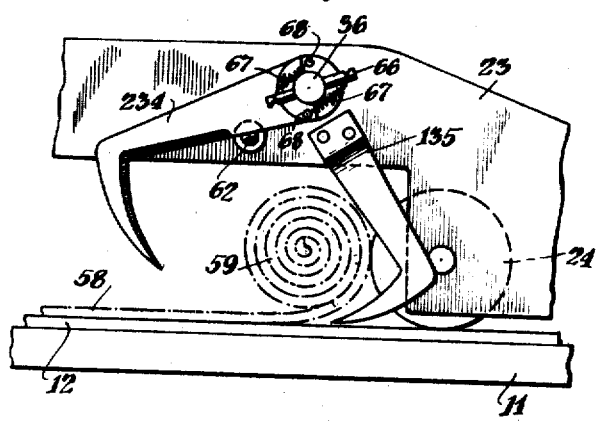
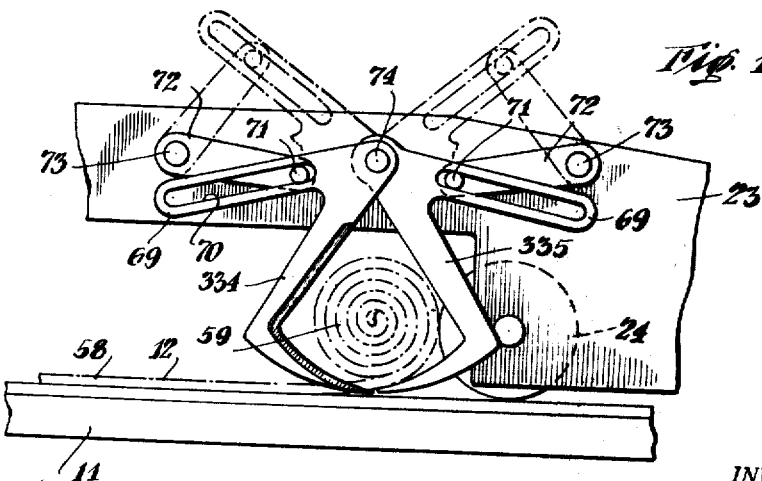
INVENTORS
William C. Grimm
BY Richard H. Linneman
Watson, Bristol, Johnson & Leavenworth
ATTORNEYS Patented Aug. 1, 1944

2,354,681

UNITED STATES PATENT OFFICE 2,354,681

BUN MAKING MACHINE

William C. Grimm and Richard H. Linneman, Jersey City, N. J., assignors to Companion Bun Machine Co., Inc., Jersey City, N. J., a corporation of New Jersey Application January 6, 1943, Serial No. 471,514

15 Claims. (Cl. 107—9)

The present invention relates to dough handling and shaping machinery and, more particularly, to such mechanisms adapted for forming, from elongated rolls of dough, buns and the like particularly adapted for human consumption.

A general object of the present invention is the provision in such mechanism of efficient means for forming a roll of dough and effectively delivering it in a certain defined path, and shearing means associated therewith successively to cut buns of desired length from the roll of dough in a sure and rapid manner which avoids unduly flattening, squeezing and misshaping them, whereby such buns of excellent shape can be produced from dough batches entirely automatically in a very rapid and economical manner, thereby preserving the dough from excessive handling, eliminating the necessity of employing skilled workmen and conserving time and skilled manpower.

A more specific object of the invention is the provision of such mechanism characterized by a shearing device which operates so quickly as to avoid undue interference with continuous travel of a dough roll and undesirable bulging or swelling of the leading end thereof as buns are severed therefrom, as well as undesirable flattening or misshaping of the buns so that the latter sufficiently retain the desired substantially cylindrical shape.

Another object of the invention is the provision in such mechanism of cooperating shear blades so constructed and operated as to reach over a moving roll of dough, engage around it and swiftly shear through it with a substantially encompassing action as distinguished from the bun-flattening and splaying shear of the roll which would result from the use of ordinary blades.

A further object of the invention is the provision in such machinery of efficient driving means whereby a common source of power drives the roll forming and delivering mechanism at a predetermined speed and may drive the shearing device at such coordinated but manually variable speed as may be desired to form buns of a desired length and permit alteration thereof at will without interfering with the speed of the roll forming and delivering means.

Still another object is the provision of a manually controlled variable speed drive for such shearing device; and means effectively to permit with continuous operation of shear blades sufficiently slow movement between the shear-completed and shear-preparatory positions thereof as to provide for unusually long rolls while providing sufficiently rapid movement thereof from the latter position to the former during shearing as effectively to avoid undue distortion of the roll and buns severed therefrom.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawings, in which:

Fig. 3 is an enlarged detailed elevational view, with parts broken away, of the dough coiling mechanism and dough roll shearing mechanism shown in Figs. 1 and 2;

Fig. 4 is an end elevational view, with parts broken away, of structure shown in Fig. 3 looking from right to left thereof;

Fig. 5 is an end elevational view, with parts broken away, of structure shown in Fig. 3 looking from left to right thereof;

Fig. 6 is an enlarged end elevational view of certain of the driving mechanism structure of the device shown in Figs. 1 and 2;

Fig. 7 is a front elevational view, with parts broken away, of a modified form of the structure shown in Fig. 3;

Fig. 8 is an end elevational view, with parts broken away, of structure shown in Fig. 7 looking from right to left thereof;

Figure 1:
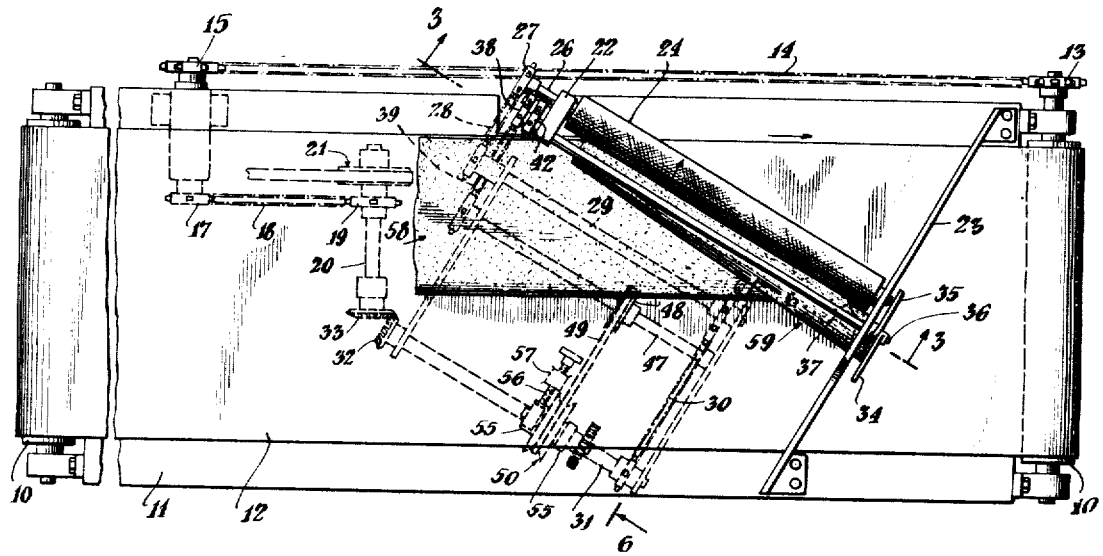
Fig. 1 is a top plan view, with parts broken away and omitted for clarification, of an embodiment of the present invention.

Figs. 9 and 10 are views similar to Figs. 7 and 8 of a still further modified form of the present invention; and Fig. 11 is a view similar to Figs. 8 and 10 of another modified form of the present invention.

Prior to the present invention many attempts have been made to devise machinery to produce certain bakery products other than by skilled hands. These attempts have been unsuccessful and prior to the present invention no one insofar as is known in the commercial trade and practical art proposed or suggested a practical mechanism capable of efficient commercial operation in the production of buns and the like from elongated rolls of dough, more particularly cinnamon buns and similar products. As is well known some such products are commonly prepared by applying to surfaces of and/or mixing into sheets of dough, desired additives such as oil, cinnamon, raisins, etc., coiling up the sheets into rolls and thereafter cutting relatively short sections from the rolls. Even the most skillful of workmen can produce such products in only very limited quantities and with the use of implements such as were available which resulted in misshaped, flattened buns splayed at the ends requiring a reshaping hand manipulation. These and other difficulties of the prior art have been greatly ameliorated if not entirely overcome by the present invention which permits rapid production in an entirely automatic manner of well-shaped buns and like products.

An embodiment of the present invention shown by way of example in the accompanying drawings is particularly designed for the employment in machinery adapted to the production of cinnamon buns and the like wherein a continuous or long sheet of dough is supplied from a suitable source, such as a hopper and sheeting rolls, onto a substantially horizontal moving endless conveyor or belt above which may be located suitable mechanism for applying successively to the top surface thereof water, oil, cinnamon and raisins if desired. Thereafter the so-treated sheet of dough, without interruption in its movement, is fed to a suitable coiling device adapted to coil it spirally as preferred into an elongated roll and deliver the so-formed roll of dough, likewise without interruption in movement, lengthwise along a defined path substantially in the direction of the axis of the dough roll. Such coiling device has associated therewith at the delivery end a roll shearing mechanism comprising a pair of shear blades so constructed and operated as to reach over a moving roll of dough, engage around it and shear through it with a substantially encompassing action. Such shearing mechanism may preferably comprise a pair of depending shear blades mounted substantially above and over the defined path at a certain distance which will permit the blades to cooperate when at least one is moved toward the other so as to engage inturned end portions of the blades beneath the dough roll to lift it from the conveying means and quickly shear through it with a substantially encompassing action. This action is so performed that the continuous movement of the dough roll will not cause the leading end thereof to be bulged or swelled by being jammed against such shearing structure to any material extent or degree of any consequence. The shearing is so accomplished as to cause the roll to be cut inwardly toward the center from a major number of the points on the circumference of the roll, as distinguished from cutting by a scissoring action or otherwise through the roll from one side to the other which always produces misshapen buns, flattened and splayed on their ends. In the preferred embodiment blades are mounted on oppositely rotating supporting structure to cause the blades to describe circles in opposite directions, with such mechanism being preferably driven through a variable speed device from the source of power employed to operate the endless conveyor, the coiling or roll forming device and any other mechanism of the machine, such as the ingredients applicators.

The present invention will be readily understood by reference to the accompanying drawings wherein a particular embodiment thereof is shown and like parts thereof are identified by like numerals throughout. Upon suitable supporting structure a pair of rolls 10, 10 are rotatably mounted, preferably at about the same elevation, with their axes arranged horizontally. A table top 11 or other substantially flat support is arranged between the rolls 10, 10 and over the top surfaces thereof an endless conveyor, such as a belt 12, is moved by the rolls 10, 10. Only one of these two rolls 10, 10 need be driven, such as by a sprocket 13, fixed preferably on the back end of one of the rolls and driven by a chain 14 from a sprocket 15 fixed on a shaft 16 carrying a sprocket 17 in turn driven by a chain 18 from a sprocket 19 fixed on a drive shaft 20 driven by any suitable means such as a pulley and belt, or sprocket and endless chain, 21 from a power source such as an electric motor (not shown). Certain of these shafts, sprockets or chain drives may also be employed to operate other mechanism such as sheeting rolls and ingredients applicators in certain definite relation to the speed and operation of the endless conveyor or belt 12.

Upon the table top 11 is suitably mounted supporting plates 22 and 23 arranged angularly to the length of the table. A coiling roll 24 is rotatably supported by the plates 22 and 23 slightly above the belt 12 so that the latter may move freely thereunder, and it will be seen from Fig. 1 that this coiling roll is so mounted as to have the axis thereof arranged at an oblique angle such as about 30° to the edge of the belt 12. As shown in Figs. 2 and 4 end plate 23 is cut away at 25 in front of the coiling roll 24 so as to provide for free passage of the dough roll therefrom in a certain defined path to suitable shearing mechanism. Preferably the coiling roll 24 is provided with a roughened surface, ridges or the like, such as knurling as shown in the drawings, to assure efficient action with respect to the sheet of dough.

A stub shaft 26 fixed to the back end of the coiling roll 24 preferably projects through the supporting plate 22 and carries thereon a pinion 27 suitably driven, such as by a chain 28 connected in any suitable manner to the drive shaft 20 such as by a shaft 29 in turn driven by a chain 30 from a shaft 31 having a bevel gear 32 meshed with another bevel gear 33 on the drive shaft 20. Thereby the roll 24 is revolved in the same direction as that in which the rolls 10, 10 revolve so that the surface of roll 24 opposes travel therebeyond of a dough sheet carried by belt 12.

The shearing mechanism preferably comprises two shearing blades 34 and 35 which may be mounted for rotation in opposite directions upon the support plate 23 by fixing the outermost blade 34 to a shaft 36 rotatably mounted within a sleeve 37 in turn rotatably supported by the support plates 22 and 23. The other blade 35 may be fixedly mounted upon the sleeve 37 so that as the shaft 36 and sleeve 37 are rotated in opposite directions by suitable mechanism the blades 34 and 35 will be carried thereby to describe circles in opposite directions. The shaft 36 may project from the end of the sleeve 37 beyond the support plate 22 and carry a sprocket 38 keyed thereto which may be suitably driven by a chain 39 meshed if desired on the lower reach thereof with a double sprocket 40 adapted to drive through a chain 41 a sprocket 42 keyed to the end of the sleeve 37, so that as the chain 39 drives the shaft 36 in one direction the sprocket 42 will drive the sleeve 37 in the opposite direction. As shown in Fig. 4 each shear blade comprises a portion 43 extending substantially radially from its supporting means, such as the shaft 36 or the sleeve 37 as the case may be, and an end portion 44 turned inwardly toward the other blade. Although such blades may be of any suitable shape in which they cooperate by encompassing a dough roll as they are moved toward each other to shear the latter, they are preferably so formed as to have the end portion 44 of each arranged substantially at a right angle to the remaining portion 43. The leading edges of these blades are preferably sharpened to provide a continuous cutting edge 45 on both portions 43 and 44 and the inwardly turned portions 44, 44 are preferably tapered substantially to a point so as readily to engage beneath a dough roll while it is being moved endwise by cooperation of the coiling roll 24 and the endless belt 12. The common axis 46 of the blades 34 and 35 is preferably arranged substantially above the defined path along which the dough roll is moved, at such a distance that the inturned portions 44, 44 of the blades 34 and 35 will just clear the upper surface of the endless belt 12 or, if desired, lightly contact the same as ends thereof move toward each other beneath the roll of dough to pick up the latter.

It is desired to provide for manual variation of the speed of operation of the shear blades within certain limits so that different lengths of buns sheared from the end of the roll of dough moved at a certain speed along a defined path beneath the blades may be obtained at will. This may be accomplished by introducing between the main drive shaft 20 and the mechanism moving the blades 34 and 35 any suitable device which may be manually adjusted for speed variation. Such mechanism may comprise a shaft 47, driving chain 39, and to which is keyed a pulley 48 driven by a belt 49 from a divided pulley structure 50 keyed for rotation with a shaft structure 51 driven from the shaft 31 by any suitable means, such as gears 52 and 54 mounted thereon with interposed pinions 53, 53 trained therewith so that the shaft 51 will be driven from shaft 31 in the opposite direction of rotation. The divided pulley structure 50 is of known construction and may comprise two plates biased toward each other and peripherally chamfered on their opposed faces to provide together a substantially V-shaped groove for reception of the belt 49. The shaft assembly 51 for the divided pulley 50 is supported by any suitable means permitting it to be moved farther away from the pulley 48 and may comprise swinging supports 55, 55 against at least one of which may be operated a hand screw 56 threadably mounted in a fixed support 57 so that the distance between the shafts 47 and 51 may be increased at will to cause the two plates 51 of the divided pulley 50 to be separated, thereby decreasing the diameter of the working circle thereof defined by the line of contact with the belt 49, thus to reduce the speed of the mechanism driving the shear blades. The speed of the latter may be increased by permitting the shaft 51 to move closer to the shaft 47 such as by the influence of suitable biasing mechanism, as spring means biasing the plates of the divided pulley 50 toward each other.

Figure 2:
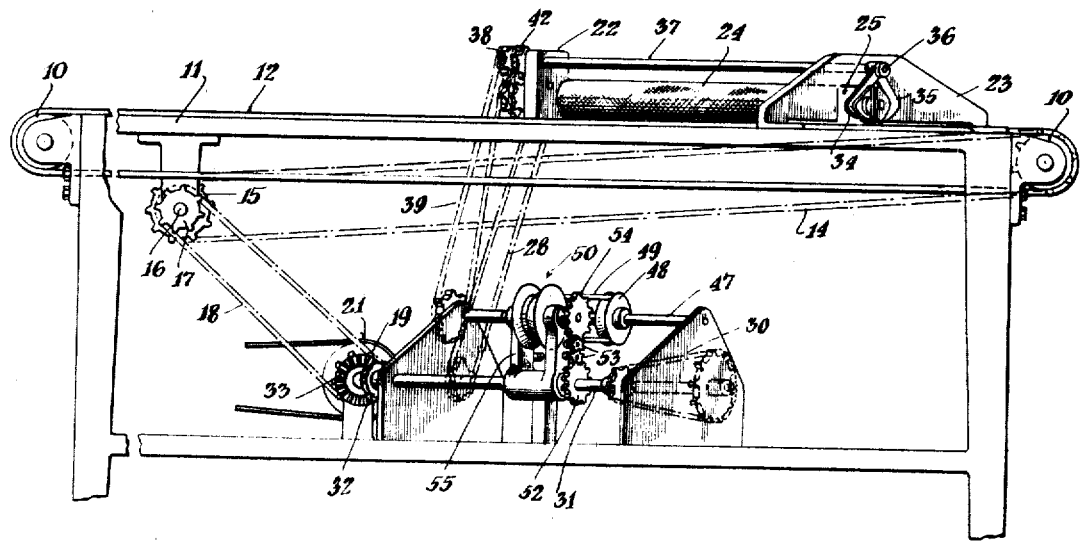
Fig. 2 is a front elevational view, with parts broken away, of the structure shown in Fig. 1.

In the operation of the device just described an elongated sheet of dough may be continuously fed to the rotating belt 12 from the lefthand end of the table structure as shown in Figs. 1 and 2. Such elongated sheet of dough, a portion of which is shown at 58 will be carried past any desired suitable ingredients applying mechanisms, such as a water applicator to wet down the near edge of the sheet of dough to increase the desired adhesion of the rolled layers of dough, an applicator to spread oil on the upper surface of the dough sheet to prevent undesired blending of dough layers, a cinnamon spreader and, if desired, a raisin distributor to feed such ingredients to the upper surface of the dough sheet. The end of the dough sheet 58 then is fed to the coiling roll 24 at an oblique angle as shown in Fig. 1 and with the end of the dough sheet properly fed to the coiling roll 24 the latter will spirally coil or roll the dough sheet back continuously into a spiralled roll 59 which will be gradually moved lengthwise by the cooperating counter-movements of belt 12 and roll 24, substantially in the direction of the axis of roll 24 through the space 25 in the end plate 23, so that the shearing device will successively shear buns from the end of the roll of dough as it moves away from in front of the coiling roll 24.

It will be understood from Figs. 3, 4, 5 and 6 that as the coiling roll 24 is rotated in a clockwise direction as there viewed, the outermost shearing blade 34 rotates in a counterclockwise direction and the innermost shearing blade 35 rotates clockwise so that as the spiralled dough roll 59 moves through the space 25 the shearing blades 34 and 35 are rotated to approach each other and engage their inturned portions 44, 44 beneath the dough roll. Thereafter as the shearing blades approach each other or move from the shear-preparatory positions shown in Fig. 4 to shear-completed positions, the blades will pick up the roll 59 and quickly shear through it with an encompassing action thus avoiding tendency to distort unduly the bun severed from the end of the spiralled roll and the roll itself.

The speed of rotation of the blades 34 and 35, which is determined by the setting of the hand screw 56, determines the lengths of the buns which are severed from the end of the spiralled dough roll, moved at a constant speed through the space 25 by cooperation of the coiling roll 24 and the conveying belt 12. It will be understood, however, that the blades 34 and 35 should not be moved during shearing at such a slow rate of speed as to cause the end of the dough roll to be unduly swelled by jamming thereagainst. Further, although the shearing blades 34 and 35 may be reversed in their relative positions shown in Figs. 1 to 6, incl., it is preferred that blade 34 be the outermost blade so that its counterclockwise rotation will tend to throw each bun as it is severed from the dough roll toward the center of the conveying belt 12, rather than toward the near edge thereof, for efficient delivery from the end of the machine.

Modifications of the invention are shown in Figs. 7, 8, 9 and 10 where one of the two shearing blades may be fixed to the end plate structure 23, or other suitable supporting structure, with the other blade rotated relative thereto. For example, as shown in Figs. 7 and 8, a blade 134 may be loosely mounted on the end of shaft 36 and be caused to rotate therewith by any suitable means. Such means may comprise a helical spring 60 disposed about the shaft 36 with one end fixed to the blade 134 and the other end fixed to a collar 61 keyed to the shaft for rotation therewith. Blade 135 is suitably fixed to the support plate 23 in position to cooperate with blade 134 but preferably in such a position as to be slightly out of the normal path of the dough roll 59 and buns may be successively severed from the end of the spiralled dough roll 59 by rotation of the shaft 36.

As further proposed in Figs. 7 and 8 the rotating blade 134 may be caused to travel through angular portions of its path at different speeds so that unusually long buns may be formed while assuring sufficiently rapid operation of the shearing action to avoid undue swelling of the end of the dough roll. This may be accomplished with the use of the helical spring 60 and collar 61 providing a loose coupling between the rotating blade 134 and the shaft 36 in association with a suitable blade checking device, such as a pin 62 reciprocatively mounted in a boss 63 on the end plate 23 and biased by a helical spring 64 to an outward position across the path of the blade 134. Thus as the blade 134 is slowly rotated to engagement with the end of the pin 62, it is stopped in its movement by the latter in a shear-preparatory position. Continued rotation of the shaft 36 causes the helical spring 60 to be wound up increasingly biasing the blade 134. Eventually the biasing force of helical spring 60 will overcome the biasing force of helical spring 64 causing the blade 134 to move the pin 62 back out of its path and thereafter permit the blade quickly to be carried forward toward the blade 135 to cooperate with the latter in picking up the dough roll 59, encompassing it and shearing through it at a relatively rapid speed.

Instead of depending entirely upon a careful selection of dimension of parts and spring stock in structure such as that shown in Figs. 7 and 8 to predetermine with a fair degree of accuracy the moment at which the blade 134 releases itself from the shear-preparatory position, a structure similar to that proposed in Figs. 9 and 10 may be utilized wherein a moving blade 234 is provided with a boss 65 in which is loosely received the end of the rotating shaft 36. The latter is fitted with a pin 66 transversely extending therethrough with the ends thereof located in diametrically opposed slots 67, 67 in the boss 65 for limiting the angular movement of the blade 234 relative to the shaft 36. In such structure the blade 234 may be biased to a leading position by springs such as 68, 68 and a device for temporarily holding the blade 234 in a shear-preparatory position may be similar to the pin structure 62 shown in Fig. 7. Accordingly as the blade 234 is moved to abut against the pin 62 the latter will stop the blade 234 and temporarily hold it during continued rotation of the shaft 36 until the pin 66 in the slot 67, 67 assumes a position shown in Fig. 10. Pin 62 will then be retracted permitting blade 234 to be rapidly carried forward by action of the highly stressed springs 68, 68.

A structure similar to that shown in Figs. 9 and 10 is compact and well adapted with slight variations to permit such mounting of one or both of a pair of revolving shearing blades. In such case, of course, the outermost blade must be temporarily stopped by a suitable structure mounted from the outside so that it will not interfere with the operation or complete rotation of the inner blade.

It will further be understood that the shearing blades may be oscillated back and forth from shear-preparatory positions to shear-completed positions and vice versa instead of being completely rotated. Such a modification is proposed in Fig. 11 where each of shearing blades 334 and 335 is provided with an arm 69 having an elongated slot 70 therein to receive a rider such as a pin 71 fixed on the end of a crank arm 72 suitably rotated by a shaft 73. Continuous rotation of the shafts 73, 73 and the crank arms 72, 72 therewith will thus cause the shearing blades 334 and 335 to be oscillated back and forth and, if desired, the shearing blades may be mounted at 74 by suitable carriage means so that they will move forward with the dough roll 59 during their movement from shear-completed positions to shear-preparatory positions to avoid interference with the dough roll. Thereafter the blades can be quickly returned by the carriage means to their initial positions so that they may be caused again to shear through the dough roll while moving from the shear-preparatory positions to the shear-completed positions, severing a bun from the end of the dough roll.

Although a preferred embodiment of the present invention has been devised for efficient employment in connection with the production of edible buns it is obvious that the use thereof, or modified forms within the scope of the invention is not limited to such production since doughs of other character or other doughy materials may be handled in similar fashion by apparatus of the present invention.

It will thus be seen that the objects set forth above are attained in an efficient manner and since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. In a bun making machine, the combination with means to move an elongated roll of dough lengthwise along a defined path substantially in the direction of its axis, of a roll shearing device comprising a pair of shear blades mounted to intercept the defined path, each blade having the outer end portion thereof turned inwardly toward the other blade to engage beyond the roll, and means to move at least one of said blades toward the other so as to engage the end portions thereof around the roll and shear through it with a substantially encompassing action.

2. In a bun making machine, the combination with means to move an elongated roll of dough lengthwise along a defined path substantially in the direction of its axis, of a roll shearing device comprising a pair of depending shear blades mounted substantially above the defined path, each blade having the lower end portion thereof turned inwardly toward the other blade to engage beneath such roll, and means to move said blades toward each other so as to engage the end portions thereof beneath the roll, pick up the latter and shear through it with a substantially encompassing action.

3. In a bun making machine, the combination with means to move an elongated roll of dough continuously lengthwise along a defined path substantially in the direction of its axis, of a roll shearing device comprising a pair of depending shear blades pivotally mounted at a common axis substantially above the defined path, each blade having the lower end portion thereof turned inwardly toward the other blade to engage beneath such roll, and means to pivot said blades toward each other so as to engage the end portions thereof beneath the roll, pick up the latter and shear through it with a substantially encompassing action, without substantially checking the continued movement of said roll of dough.

4. In a bun making machine, the combination with means to move an elongated roll of dough lengthwise along a defined path substantially in the direction of its axis, of a roll shearing device comprising a pair of depending shear blades mounted substantially above the defined path, each blade having the lower end portion thereof turned inwardly toward the other blade substantially at a right angle to the remaining portion of the blade to engage beneath such roll, both of said portions of each blade being provided with a cutting edge, and means to move at least one of said blades toward the other so as to engage the end portions thereof beneath the roll and shear through it with a substantially encompassing action.

5. In a bun making machine, the combination with means to move an elongated roll of dough lengthwise along a defined path substantially in the direction of its axis, a roll shearing device comprising a pair of depending shear blades pivotally mounted at a common axis substantially above the defined path, each blade having the lower end portion thereof turned inwardly toward the other blade to engage beneath such roll, and means to rotate said blades about their common axis in opposite directions with the end portions thereof leading so as to engage the latter beneath the roll, pick it up and shear through it with a substantially encompassing action.

6. In a bun making machine, the combination comprising, means for continuously rotating an elongated roll of dough substantially about its axis and moving it during rotation lengthwise generally along a defined path substantially in the direction of its axis, and a roll shearing device comprising a pair of shear blades mounted to intercept the path of the rotated roll, each blade having the outer end portion thereof turned inwardly toward the other blade to engage beyond the rotated roll, and means to move at least one of said blades toward the other so as to engage the end portions thereof around the rotated roll and shear through it with a substantially encompassing action while it is being rotated.

7. In a bun making machine, the combination comprising, means for continuously rotating an elongated roll of dough substantially about its axis and moving it during rotation lengthwise generally along a defined path substantially in the direction of its axis, and a roll shearing device comprising a pair of depending shear blades mounted substantially above the path of the rotated roll, each blade having the lower end portion thereof turned inwardly toward the other blade to engage beneath the rotated roll, and means to move said blades toward each other so as to engage the end portions thereof beneath the rotated roll, pick up the latter and shear through it with a substantially encompassing action while it is being rotated.

8. In a bun making machine, the combination comprising, means for continuously rotating an elongated roll of dough substantially about its axis and moving it during rotation lengthwise generally along a defined path substantially in the direction of its axis, and a roll shearing device comprising a pair of depending shear blades pivotally mounted at a common axis substantially above the path of the rotated roll, each blade having the lower end portion thereof turned inwardly toward the other blade to engage beneath the rotated roll, and means to pivot said blades toward each other so as to engage the end portions thereof beneath the rotated roll, pick up the latter and shear through it with a substantially encompassing action while it is being rotated.

9. In a bun making machine, the combination comprising, means for continuously rotating an elongated roll of dough substantially about its axis and moving it during rotation lengthwise generally along a defined path substantially in the direction of its axis, and a roll shearing device comprising a pair of depending shear blades mounted substantially above the path of the rotated roll, each blade having the lower end portion thereof turned inwardly toward the other blade substantially at a right angle to the remaining portion of the blade to engage beneath the rotated roll, both of said portions of each blade being provided with a cutting edge, and means to move at least one of said blades toward the other so as to engage the end portions thereof beneath the rotated roll and shear through it with a substantially encompassing action while it is being rotated.

10. In a bun making machine, the combination comprising, means for continuously rotating an elongated roll of dough substantially about its axis and moving it during rotation lengthwise generally along a defined path substantially in the direction of its axis, and a roll shearing device comprising a pair of depending shear blades pivotally mounted at a common axis substantially above the path of the rotated roll, each blade having a substantially radially extending portion and a tapered end portion extending therefrom substantially at a right angle thereto toward the other blade to engage beneath the rotated roll, each blade being provided on both portions thereof with a continuous cutting edge, and means to pivot said blades toward each other so as to engage the end portions thereof beneath the rotated roll, pick up the latter and shear through it with a substantially encompassing action while it is being rotated.

11. In a bun making machine, the combination comprising, means for continuously rotating an elongated roll of dough substantially about its axis and moving it during rotation lengthwise generally along a defined path substantially in the direction of its axis, and a roll shearing device comprising a pair of depending shear blades pivotally mounted at a common axis substantially above the path of the rotated roll, each blade having the lower end portion thereof turned inwardly toward the other blade to engage beneath the rotated roll, and means to rotate said blades about their common axis in opposite directions with the end portions thereof leading so as to engage the latter beneath the rotated roll, pick up the latter and shear through it with a substantially encompassing action while it is being rotated.

12. In a bun making machine, the combination with means to move an elongated roll of dough lengthwise along a defined path substantially in the direction of its axis, of a roll shearing device comprising a shaft rotatably mounted substantially above the defined path with the axis of the former located substantially parallel to the latter, a sleeve rotatably mounted about said shaft, a pair of shear blades with one mounted on said shaft for rotary movement thereby and the other mounted on said sleeve for rotary movement thereby, said blades when substantially depending from their common axis in shear-preparatory positions having the lower end portions thereof turned inwardly toward each other to engage beneath such roll, and means to rotate said shaft and said sleeve in opposite directions so as to move said blades toward each other across the defined path.

13. In a bun making machine, the combination with means to move an elongated roll of dough lengthwise along a defined path substantially in the direction of its axis, of a roll shearing device comprising a shaft rotatably mounted substantially above the defined path with the axis of the former located substantially parallel to the latter, a sleeve rotatably mounted about said shaft, a pair of shear blades with one mounted on said shaft for rotary movement thereby and the other mounted on said sleeve for rotary movement thereby, said blades when substantially depending from their common axis in shear-preparatory positions having the lower end portions thereof turned inwardly toward each other substantially at right angles to the remaining portions thereof to engage beneath such roll, and means to rotate said shaft and said sleeve in opposite directions so as to move said blades toward each other across the defined path, both of said portions of each blade being provided on the leading edges thereof with a cutting edge.

14. In a bun making machine the combination with means to move an elongated roll of dough lengthwise along a defined path substantially in the direction of its axis, of a roll shearing device comprising a pair of depending shear blades mounted substantially above the defined path, and means to move at least one of said blades toward the other to shear the roll into separate buns comprising variable speed means to move said blade from shear-completed position to shear-preparatory position at a selected rate of speed to determine length of buns and means to move said blade from shear-preparatory position to shear-completed position at a relatively fast rate of speed.

15. In a bun making machine the combination with means to move an elongated roll of dough lengthwise along a defined path substantially in the direction of its axis, of a roll shearing device comprising a pair of depending shear blades mounted substantially above the defined path, and means to move at least one of said blades toward the other to shear the roll into separate buns comprising driven means loosely supporting one of said shear blades, spring means biasing said blade to a leading angular position on said driven means, and means to engage and temporarily to hold said blade at shear-preparatory position while said driven means increases the blade biasing force of said spring means as said blade is caused to assume a trailing angular position, said blade engaging means being adapted to release said blade from the latter position permitting said spring means to move said blade from the shear-preparatory position to a shear-completed position at an angular speed greater than the angular speed of said driven means.

WILLIAM C. GRIMM.
RICHARD H. LINNEMAN.